United States Patent
Murfree, Jr. et al.

[15] 3,667,219
[45] June 6, 1972

[54] GAS GENERATOR WITH LIQUID INITIATOR

[72] Inventors: James A. Murfree, Jr., Huntsville; Theodore N. Hubbuch, Florence; Henry A. Nappier, Lacey's Spring; William A. Duncan, Huntsville; Billy J. Sandlin, Athens, all of Ala.

[73] Assignee: The United States of America as represented by the Secretary of the Army

[22] Filed: July 5, 1967

[21] Appl. No.: 651,327

[52] U.S. Cl.................................60/39.46, 23/281, 60/218, 60/39.82
[51] Int. Cl. .........................................F02c 3/20, F02g 1/00
[58] Field of Search ......................149/36; 60/218, 251–260, 60/39.46, 39.82; 23/281

[56] References Cited

UNITED STATES PATENTS

| | | | |
|---|---|---|---|
| 3,101,589 | 8/1963 | Hamrick et al. | 60/39.82 |
| 3,298,182 | 1/1967 | Webb | 60/218 |

*Primary Examiner*—Samuel Feinberg
*Attorney*—Harry M. Saragovitz, Edward J. Kelly, Herbert Berl and Elihu L. Turetsky

[57] ABSTRACT

Porous support materials such as porous firebrick and unglazed clay plate having suspended therein a liquid initiator (oxidizing agent) for gas generators employing exothermally decomposing monopropellants.

10 Claims, No Drawings

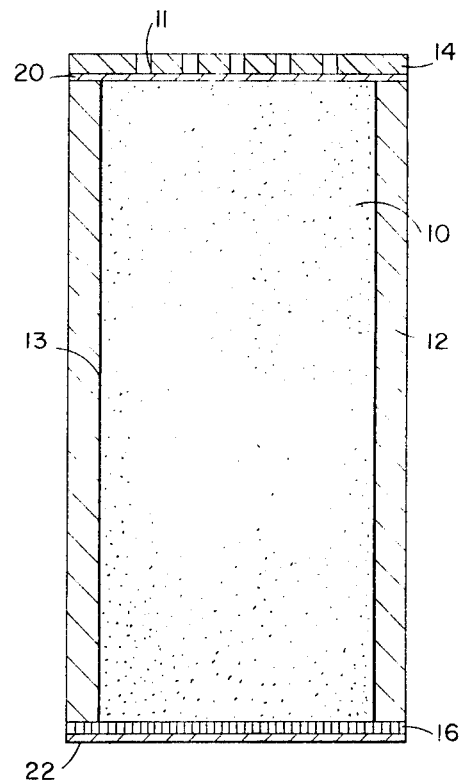
James A. Murfree, Jr.
Theodore N. Hubbuch
Henry A. Nappier
William A. Duncan
Billy J. Sandlin,
        INVENTORS.

GAS GENERATOR WITH LIQUID INITIATOR

BACKGROUND OF THE INVENTION

This invention relates to the use of liquids as initiators for gas generators employing exothermally decomposing monopropellants.

There is considerable interest in the rocket propulsion industry in the development and use of liquid monopropellant gas generators. Although the majority of work in this field has been in catalytic decomposition schemes, recent attention has been focused on schemes of gas generation utilizing a liquid monopropellant with an initiator and an inert porous bed or support as is more particularly disclosed in copending application, Ser. No. 651,654, filed July 5, 1967. In these schemes, the monopropellant reacts with the initiator to start decomposition, generate heat, and heat the support which, when heated, thermally sustains the decomposition.

Accordingly, the principal object of this invention is to provide a "one-shot" generator employing a liquid initiator.

SUMMARY OF THE INVENTION

It has been discovered that certain porous support materials can be used to hold in suspension therein certain liquids for use as initiators for gas generators employing exothermally decomposing monopropellants such as hydrazine.

BRIEF DESCRIPTION OF THE DRAWING

The FIGURE is a cross-sectional view of the preferred embodiment of a gas generating bed of this invention.

DESCRIPTION OF THE PREFERRED EMBODIMENT

Certain porous support materials such as porous firebrick and unglazed clay plate have a capacity for holding quantities of liquids in a manner much like that of a sponge holding water.

The FIGURE shows porous firebrick 10 having inhibited red fuming nitric acid for use as an initiator incorporated therein. A metal sleeve 12 is secured to firebrick 10 by a refractory adhesive 13. A pressurized monopropellant injector (not shown) and injector plate 14 are utilized to inject the monopropellant through holes 11 into the firebrick 10 and initiator therein. A wire retaining screen 16 (or other perforated support) is secured to a gas generator housing (not shown) in a conventional manner. Thin layers of aluminum foil 20 and 22 surround firebrick 10 on the top and bottom, respectively, and are used as blowout seals.

The gas generating bed is secured to the gas generator housing in a conventional manner.

The inhibited red fuming nitric acid (IRFNA) is applied to the porous firebrick and is suspended within the pores of the brick because of the viscosity of the IRFNA. Sufficient IRFNA is held such that when hydrazine or other exothermally decomposing monopropellant is allowed to come into contact with the brick, there is instant ignition of the monopropellant because of the hypergolic reaction. In other words, liquids such as IRFNA are used as initiators for gas generators incorporating monopropellants such as hydrazine, monomethylhydrazine, 1,1-dimethylhydrazine and other exothermally decomposing monopropellants.

Inhibited red fuming nitric acid is defined herein to mean inhibited both as to decomposition and corrosion. Hydrofluoric acid is the preferred inhibitor. The porous firebrick has a porosity of from about 65 percent to about 85 percent. The preferred porosity is about 73 percent.

Other porous support materials may be used as a carrier or substrate; e.g., unglazed clay plate with a similar porosity.

Other liquid initiators (starters) may be used (e.g., titanium tetrachloride, phosphorous trichloride or phosphorous oxychloride).

In operation, the monopropellant is allowed to come into contact with the porous support material impregnated with the initiator by piercing holes in the upper blowout seal 20. The pressurized streams of monopropellant flow are sufficient to accomplish this. The initiator and monopropellant react rapidly and vigorously with the evolution of heat which heats the carrier to such a temperature as to maintain the exothermic decomposition of the monopropellant after the initiator is consumed. The monopropellant decomposition generates hot pressurized gas for use in pressurizing devices (after blowing out the lower blowout seal 22 either partially or entirely).

Many variations and modifications of this invention will be readily apparent to those skilled in the art in the light of the above teachings, which variations and modifications are within the spirit and scope of this invention.

We claim:

1. In a liquid gas generator: a gas generating bed for use in a process of gas generation; said bed including a porous support material; and a liquid initiator suspended in said porous support material, said liquid initiator comprising inhibited red fuming nitric acid, titanium tetrachloride, phosphorous trichloride or phosphorous oxychloride.

2. A gas generating bed as set forth in claim 1 wherein said porous support material is porous firebrick or unglazed clay plate.

3. A gas generating bed as set forth in claim 1 wherein said porous support material is porous firebrick and said liquid initiator is inhibited red fuming nitric acid.

4. A gas generating bed as set forth in claim 1 wherein said porous support material is porous firebrick and said liquid initiator is titanium tetrachloride.

5. A gas generating bed as set forth in claim 1 wherein said porous support material is porous firebrick and said liquid initiator is phosphorous trichloride.

6. A gas generating bed as set forth in claim 1 wherein said porous support material is porous firebrick and said liquid initiator is phosphorous oxychloride.

7. A gas generating bed as set forth in claim 1 wherein said porous support material is unglazed clay plate and said liquid initiator is inhibited red fuming nitric acid.

8. A gas generating bed as set forth in claim 1 wherein said porous support material is unglazed clay plate and said liquid initiator is titanium tetrachloride.

9. A gas generating bed as set forth in claim 1 wherein said porous support material is unglazed clay plate and said liquid initiator is phosphorous trichloride or phosphorous oxychloride.

10. A gas generating bed as set forth in claim 1 wherein said bed further includes an injector plate at one end of said porous support material with a first blowout seal between said one end of said porous support material and said plate and a second blowout seal at the other end of said porous support material with a perforated support between said other end of said porous support material and said second blowout seal.

* * * * *